No. 666,703. Patented Jan. 29, 1901.
C. SEILACHER.
APPARATUS FOR CONGEALING GELATINOUS SUBSTANCES.
(Application filed Oct. 18, 1900.)
(No Model.)
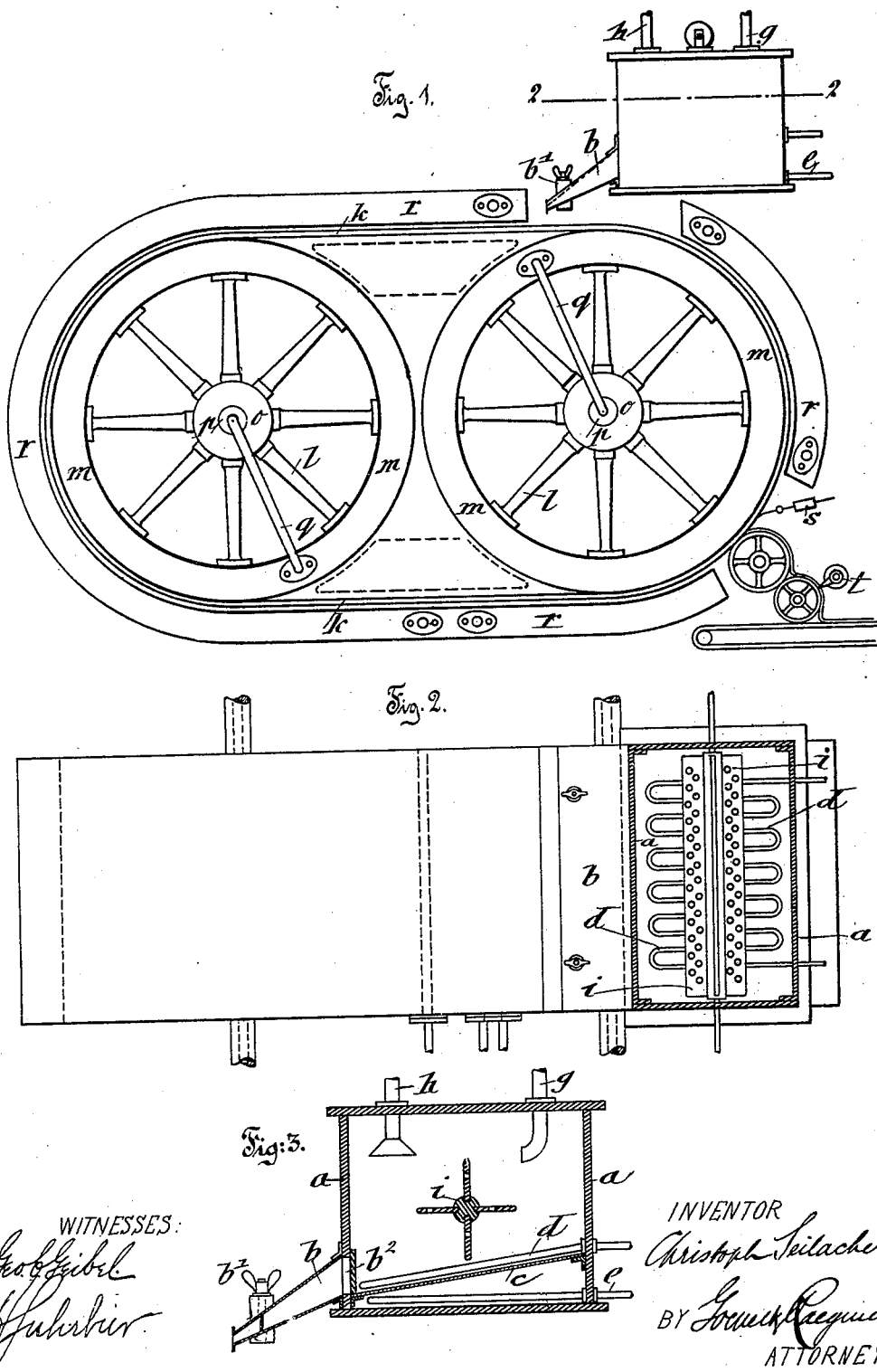
WITNESSES:
INVENTOR
Christoph Seilacher
BY
ATTORNEYS

UNITED STATES PATENT OFFICE.

CHRISTOPH SEILACHER, OF STUTTGART, GERMANY.

APPARATUS FOR CONGEALING GELATINOUS SUBSTANCES.

SPECIFICATION forming part of Letters Patent No. 666,703, dated January 29, 1901.

Application filed October 18, 1900. Serial No. 33,432. (No model.)

*To all whom it may concern:*

Be it known that I, CHRISTOPH SEILACHER, a citizen of the Empire of Germany, residing in Stuttgart, in the Kingdom of Würtemberg, Germany, have invented certain new and useful Improvements in Apparatus for Congealing Gelatinous Substances, of which the following is a specification.

This invention relates to an improved apparatus for congealing gelatinous substances, such as gelatin, glue, and similar substances, and to the feed device for supplying said substances in a pasty form to the said apparatus.

In the apparatus which was heretofore used for congealing gelatin, glue, and similar substances a serious objection was experienced by the cracking or breaking of the thin sheets or layers of liquid gelatin while congealing. The reason for this is that the hot liquid mass adheres more or less to the surface of the metallic apron to which the same is transferred and shrinks to a greater extent than the apron. This objection can be overcome by supplying the gelatinous substances not in a thin easily-flowing liquid, but in a paste-like condition and forcing them under pressure onto the cooling-apron. My invention is based on this fundamental idea; and it consists of a feed device for an apparatus for congealing gelatinous substances, which feed device consists of a receiving-box for said substances, an inclined bottom in the same, a cooling-coil arranged close to the inclined bottom, a rotary agitator above the cooling-coil, a supply-pipe for the liquid gelatin, and a pipe for supplying air or other fluid under pressure to the inside of the feed-box.

The invention consists, further, of certain details of construction and combinations of parts, as will be fully described hereinafter and finally pointed out in the claims.

In the accompanying drawings, Figure 1 is a side elevation of my improved apparatus for congealing gelatinous substances. Fig. 2 is a plan view, partly in horizontal section, through the device on line 2 2, Fig. 1; and Fig. 3 is a vertical transverse section on line 3 3, Fig. 2, of the feed device, drawn on a larger scale.

Similar letters of reference indicate corresponding parts.

Referring to the drawings, $k$ indicates an endless metallic apron which is conducted over two drums $m$, that are constructed in the nature of annular hollow receptacles which are connected by radial spokes $l$ with their hubs $o$. To the hollow axles of the drums $m$ is supplied a cooling liquid—such as air, water, &c.—which is conducted by radial pipes $q$ into the hollow rims of the drums $m$. The thus-cooled drums exert thereby a cooling action on the metallic apron $k$ and on the gelatinous substances transmitted to the same. Above and around the apron are arranged hollow cooling-receptacles $r$ in close proximity to said apron $k$, said receptacles being constructed of a shape corresponding to the shape of the apron, as shown in Fig. 1. The receptacles $r$ are cooled in the same manner as the drums by water, air, or any other cooling medium supplied to the same by suitable inlet and outlet pipes. At the lower part of the apron $k$, below the feed device F, is arranged a pivoted and weighted clearer $s$, which separates the congealed sheet of gelatinous substance from the endless apron $k$, said sheet being then conducted over suitable rollers toward a rotating cutting-knife $t$, by which the same is divided into sheets of the required size, which are conducted off by an endless conveyer $u$.

The feed device F consists of a closed feed-box $a$, which is provided at its interior with an inclined bottom $c$ and an inclined discharge-nozzle $b$, which is made equal in width with the feed-box $a$. The upper part of the discharge-nozzle $b$ is made movable, so as to be adjusted relatively to the bottom part of the same, which is accomplished by means of adjusting-screws $b'$, as shown in Fig. 3. The adjustable top part of the nozzle permits the adjustment of the nozzle to greater or smaller extent, so as to regulate the thickness of the gelatinous substance discharged through the same. A slide-plate $b^2$ permits opening or closing, partly or entirely, the opening in the front wall of the feed-box. The inclined bottom $c$ facilitates the easy flowing off of the gelatinous substance in the feed-box $a$. Above the bottom of the box $a$ is arranged a cooling-coil $d$, which is entirely surrounded by the liquid gelatinous substance. Above the cooling-coil is arranged an agitator $i$, which is rotated by a belt-and-pulley transmission, so that all the parts of the gelatinous substance are brought into contact with the cooling-coil $d$. Below the inclined bottom $c$ is arranged a steam or hot-water supply pipe $e$, so as to slightly heat up the space below the bottom $c$ and facilitate thereby the passage of the gelatinous substance over the same. The liquid gelatinous mass is introduced by a pipe $g$ into the feed-box $a$, while a second pipe $h$ supplies air or any other gas under pressure into the feed-box.

My improved apparatus for congealing gelatinous substances is operated as follows: After the liquid gelatin or glue is introduced into the feed-box the same is subjected for some time to the action of the cooling-coil. During this time the opening in the feed-box connected with the nozzle is partly or entirely closed by means of the slide-plate. By the cooling action of the coil $d$ and rotary agitator on the gelatinous substance the same gradually assumes a paste-like constituency. As soon as this is accomplished the slide-plate is opened, and air under pressure is permitted to enter into the feed-box. The pressure of the air or gas acts on the surface of the mass and forces the same through the opening of the feed-box into the discharge-nozzle, from which it passes onto the cooling-apron $k$. For facilitating the passage of the pasty gelatinous substance over the inclined bottom the under side of the same is heated up by the steam or hot-air pipe located below the same. This heating from below permits the free gliding of the mass over the upper side of the inclined bottom. The nozzle may be divided longitudinally by suitable partitions into individual nozzles of width corresponding to the width of the sheets of gelatin or glue to be produced. The gelatinous substance is conducted forward by the movable endless apron and congealed by the cooling action of the same and the surrounding cooling-receptacles until the sheets are removed by the clearer and cut by the rotary knife into pieces of the required size. The liquid gelatin or glue supplied into the feed-box is continuously cooled during its passage over the agitator and cooling-coil and is then supplied in a pasty condition to the nozzle. In this condition the tearing or breaking of the gelatinous sheets by shrinkage is entirely obviated, as owing to its pasty condition the gelatin does not adhere to the surface of the cooling-apron and can freely shrink on the same.

By the endless cooling-apron the length of the apparatus can be considerably shortened and the same brought within a much smaller compass than similar congealing apparatus heretofore in use. The greatest advantage, however, of my improved apparatus consists in the fact that by the use of the feed-box in which the liquid gelatin is converted into a pasty mass very thin sheets can be produced which could not be produced in the same degree of thinness heretofore and which are preferred by the trade owing to their greater convenience in use.

Having thus described my invention, I claim as new and desire to secure by Letters Patent—

1. In an apparatus for congealing gelatinous substances, a feed device consisting of a receiving-box for the gelatinous substance provided with an inclined bottom, a cooling-coil arranged close to the inclined bottom, a rotary agitator above the cooling-coil, a discharge-nozzle at the lower end of the inclined bottom, a supply-pipe for the liquid gelatin, and a pipe for supplying air or other fluid under pressure to the inside of the feed-box, substantially as set forth.

2. In an apparatus for congealing gelatinous substances, a feed device consisting of a feed-box provided with an inclined bottom, a cooling-coil above the same, a rotary agitator above said cooling-coil, a discharge-nozzle, means for adjusting the discharge-opening of the nozzle, a slide-plate for opening or closing the discharge-nozzle, a supply-pipe for the liquid gelatin, and a pipe for compressing a fluid under pressure into the interior of the feed-box, substantially as set forth.

3. In an apparatus for congealing gelatinous substances, a feed device consisting of a feed-box provided with an inclined bottom, a heating-pipe below said inclined bottom, a cooling-coil above the same, a rotary agitator above said cooling-coil, a discharge-nozzle, means for adjusting the discharge-opening of the nozzle, a slide-plate for opening or closing the discharge-nozzle, a supply-pipe for the liquid gelatin, and a pipe for compressing a fluid under pressure into the interior of the feed-box, substantially as set forth.

In testimony that I claim the foregoing as my invention I have signed my name in presence of two subscribing witnesses.

CHRISTOPH SEILACHER.

Witnesses:
KONRAD ZEISIG,
FRD. HAESPERMANN.